Nov. 25, 1952     E. M. WILLIAMS     2,619,590
DISCRIMINATING PANORAMIC RECEIVER
Filed April 26, 1946     3 Sheets-Sheet 1

INVENTOR
EVERARD M. WILLIAMS
BY
William D. Hall.
ATTORNEY

Nov. 25, 1952     E. M. WILLIAMS     2,619,590

DISCRIMINATING PANORAMIC RECEIVER

Filed April 26, 1946     3 Sheets-Sheet 3

INVENTOR
EVERARD M. WILLIAMS
BY
William D. Hall.
ATTORNEY

Patented Nov. 25, 1952

2,619,590

UNITED STATES PATENT OFFICE 2,619,590

DISCRIMINATING PANORAMIC RECEIVER

Everard M. Williams, Pittsburgh, Pa.

Application April 26, 1946, Serial No. 665,034

25 Claims. (Cl. 250—20)

(Granted under the act of March 3, 1883, as amended April 30, 1928; 370 O. G. 757)

The invention described herein may be manufactured and used by or for the Government for governmental purposes, without the payment to me of any royalty thereon.

My invention relates to a scanning or panoramic receiver; in particular it provides a panoramic receiver which discriminates against radar pulse signals and also distinguishes between frequency modulated and amplitude modulated continuous wave signals. This is done by dividing the scanning period of the panoramic receiver into a great number of elements and integrating all the signals received during each element. In so doing the pulse signals are made to disappear leaving only the continuous signals. By making the elements increase stepwise in frequency my panoramic receiver can be made to reject amplitude modulated signals.

Accordingly it is a purpose of my invention to provide a scanning receiver which is responsive only to continuous signals.

It is another purpose of my invention to provide a scanning receiver which shall be unresponsive to pulse signals.

It is another purpose of my invention to provide a scanning receiver which shall be responsive to frequency modulated signals but unresponsive to amplitude modulated signals.

It is another purpose of my invention to provide a panoramic receiver in which all signals received over a narrow bandlet of frequency shall be indicated by a single pip in the receiver presentation.

It is another purpose of my invention to provide a panoramic receiver which will distinguish between amplitude and frequency modulation.

In order to fulfill these and other purposes I have provided a receiver in which my invention is embodied and which is illustrated in the accompanying drawings.

In the drawings—

Figure 1:
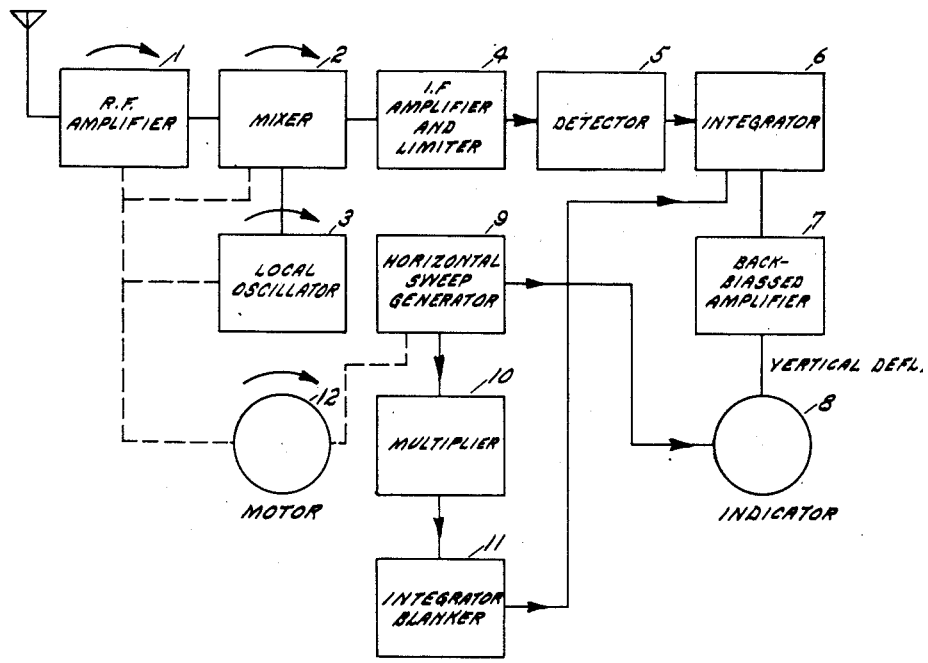
Figure 1 represents in block diagram a panoramic receiver embodying one form of my invention.

In Figure 1 there are shown many of the elements of a normal panoramic receiver. A radio signal is received and amplified in a sweeping tuned-radio-frequency amplifier 1 and passed therefrom to a mixer 2 where it is heterodyned by signal received from sweeping heterodyne oscillator 3.

The sweep tuning of amplifier 1, mixer 2 and local oscillator 3 is synchronized by a common drive for all three from motor 12. The intermediate frequency output of mixer 2 is amplified in intermediate frequency amplifier 4, the last stage of which comprises an amplifier limiter so that the amplitude of all signals of sufficient intensity is reduced to a common level. The output of intermediate frequency amplifier 4 is received in detector 5, where it is demodulated and a direct current signal is generated.

Motor 12 also controls the initiation of each cycle of a horizontal sweep generator 9, which generates a panoramic sweep voltage in synchronism with the sweep of the heterodyne frequency generated in heterodyne oscillator 3. This signal is applied to the sweep plates of the cathode ray tube indicator 8.

Thus far all the elements described are those of a conventional panoramic receiver. The additions to the panoramic receiver which are novel comprise a multiplier 10 which derives from the panoramic sweep frequency generated in horizontal sweep generator 9 a harmonic of high order to be used as the frequency of a blanking signal. In a specific instance the 1,000th harmonic was selected. With a panoramic sweep rate of 5 per second this produces a blanking frequency of 5,000 C. P. S. The blanking signal is passed to integrator blanker 11. In integrator blanker 11 a train of blanking pulses is generated at the rate of the frequency of the blanking signal. These pulses are of negative polarity and of brief duration as compared with the interval between pulses.

The output of integrator blanker 11 is applied to integrator 6 to set the interval of integration which in the instance cited was 1/5,000 second or 200 microseconds. The direct current output of detector 5 is applied to integrator 6 and is there integrated over the 200 microsecond interval.

It will be seen that any pulse signal of materially less than 200 microseconds duration will develop a signal of very low intensity in the integrator 6, for in amplifier 4 the excessive amplitude of a pulse signal is cut down to the level of continuous signals and in integrator 6 the output corresponding to a pulse signal is reduced as compared to a continuous signal approximately by the ratio of the width of the pulse signal to the blanking interval. The common radar pulse of 2 microseconds width is thus reduced in effective intensity in the ratio of something like 2 to 200.

The integrated signal output of integrator 6 is passed to back-biased amplifier 7. Due to back bias the amplifier does not amplify signals below a certain threshold, and this threshold is set so as to discriminate against the pulse signals ordinarily encountered but to pass the continuous signals.

From amplifier 7 the signal is passed to cathode ray tube indicator 8, where it is placed upon the signal plates. The frequency spectrum presentation of indicator 8 is similar to that of the ordinary panoramic receiver. It will be seen that the operation of integrator 6 at the integrator blanking rate divides up the frequency spectrum of the panoramic receiver into a large number of elements, in the instance cited, 1,000. All frequencies occurring within the same spectral element are indicated by the same pip in the presentation, but this is scarcely a disadvantage, as the resolution of the panoramic receiver is thereby scarcely reduced below what it would be otherwise. In practice the resolution of the receiver is limited rather by the width of the cathode ray spot and the selectivity of intermediate frequency amplifier 4.

Figure 2:
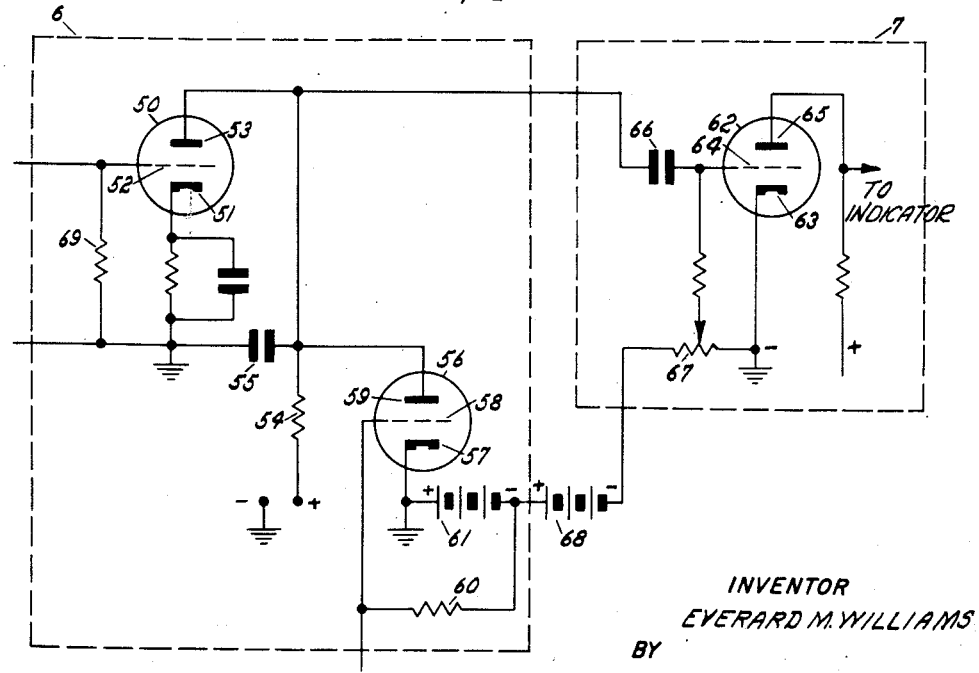
Figure 2 represents a circuit diagram of a preferred form of an integrator and back-biased amplifier used in my invention.

In Figure 2 is shown a preferred form of integrator 6 and back-biased amplifier 7 is circuit diagram.

An amplifier tube 50 with cathode 51, grid 52 and plate 53 is shown in a normal amplifier circuit with a fairly low bias voltage on grid 52 of tube 50. The output of detector 5 is shown conductively coupled across grid leak resistor 69 between grid 52 and cathode 51. In the voltage supply circuit of plate 53 is shown a dropping resistor 54 and between plate 53 and cathode 51 a capacitor 55. The time constant of capacitor 55 and resistor 54 is made comparable to the interval between the pulses from integrator blanker 11.

A second tube 56 having cathode 57, grid 58 and plate 59, is connected in a discharge circuit across capacitor 55, the plate 59 being connected to the high side and cathode 57 to the low side. The output of integrator blanker 11 is connected across grid 58 and cathode 57. A normal grid leak 60 and negative grid bias supply 61 in series connect grid 58 and cathode 57.

An amplifier circuit comprising tube 62 constitutes the back-biased amplifier 7. Tube 62 has cathode 63, grid 64 and plate 65. Voltage across capacitor 55 is impressed thru blocking capacitor 66 upon the grid 64. Grid 64 is connected to an adjustable tap on potentiometer 67. Potentiometer 67 is connected across a voltage supply formed of battery 68 in series with bias supply 61. Grounded cathode 63 is connected to the positive terminal of potentiometer 67. Output of the tube 62 is taken across the circuit of plate 65 in the usual manner and is led to the signal plates of cathode ray tube indicator 8. Return circuits throughout are through ground.

In operation the grid 52 of tube 50 is normally biased fairly lightly, so that considerable plate current flows through the plate 53 of tube 50. There is considerable voltage drop through resistor 54 and capacitor 55 is charged at a relatively low potential. Grids 58 and 64 of tubes 56 and 62 respectively are normally biased below cut-off.

The polarity of the unidirectional output of detector 5 is applied to grid 52 in the sense to drive it more negative. This output is present only when the panoramic receiver is sweeping through a signal. Considering that at the start of an integrating interval there is signal on grid 52 and the plate of potential at plate 53 is low, it will be seen that capacitor 55 will charge continuously so long as signal is applied to grid 52 and that the voltage across capacitor 55 will continue to rise. With signal corresponding to the maximum amplitude passed by the limiter in amplifier 4 the voltage on the high side of capacitor 55 rises by a considerable amount if applied continuously throughout an integrating interval. At the end of the interval this rise in voltage is sufficient to start amplification in tube 62, for the high side of capacitor 55 is connected through capacitor 66 to grid 64 of tube 62, and the positive voltage thus impressed is sufficient to override the high negative bias supplied to grid 64 by potentiometer 67. If, however, the signal applied to grid 52 is only a pulse short compared to the integrating interval, the rise of voltage across capacitor 55 is too slight to bring grid 64 up enough to override the back bias. Thus tube 62 amplifies a signal and causes deflection on the indicator during an integrating interval only if received signals endure for the entire interval. This effect is independent of signal intensity because of the use of a limiter in I. F. amplifier 4. The exact point of discrimination between what signal is passed by tube 62 and what is not passed is determined by the setting of potentiometer 67.

At the end of the integrating interval a pulse from integrator blanker 11 is applied to grid 58 of discharge tube 56 rendering the plate circuit highly conductive. Accordingly capacitor 55 discharges rapidly through that circuit. The voltage on plate 50 falls to a low value. At the termination of the pulse from blanker 11 tube 56 ceases to be conductive, and a new integrating interval of tube 50 commences.

If no signal appears on grid 52 during an integrating interval, tube 50 continues to draw a fairly heavy current throughout the cycle and the potential across capacitor 55 never rises. Accordingly tube 62 never amplifies.

At the end of each integrating interval it is seen that the bias on grid 64 returns to negative and the discharge of tube 62 is stopped. Thus tube 62 forms in each integrating interval either no signal or a single pulse occupying the latter portion of the interval. This is the pulse which is applied to the plates of cathode ray tube indicator 8.

The integrating interval is made equal to the time required for the panoramic receiver to sweep across the range of frequencies encompassed within the band width of amplifier 4.

Thus the circuit shown in Figure 1 discloses a panoramic receiver which is responsive to continuous signals but unresponsive to pulse signals.

Figure 3:
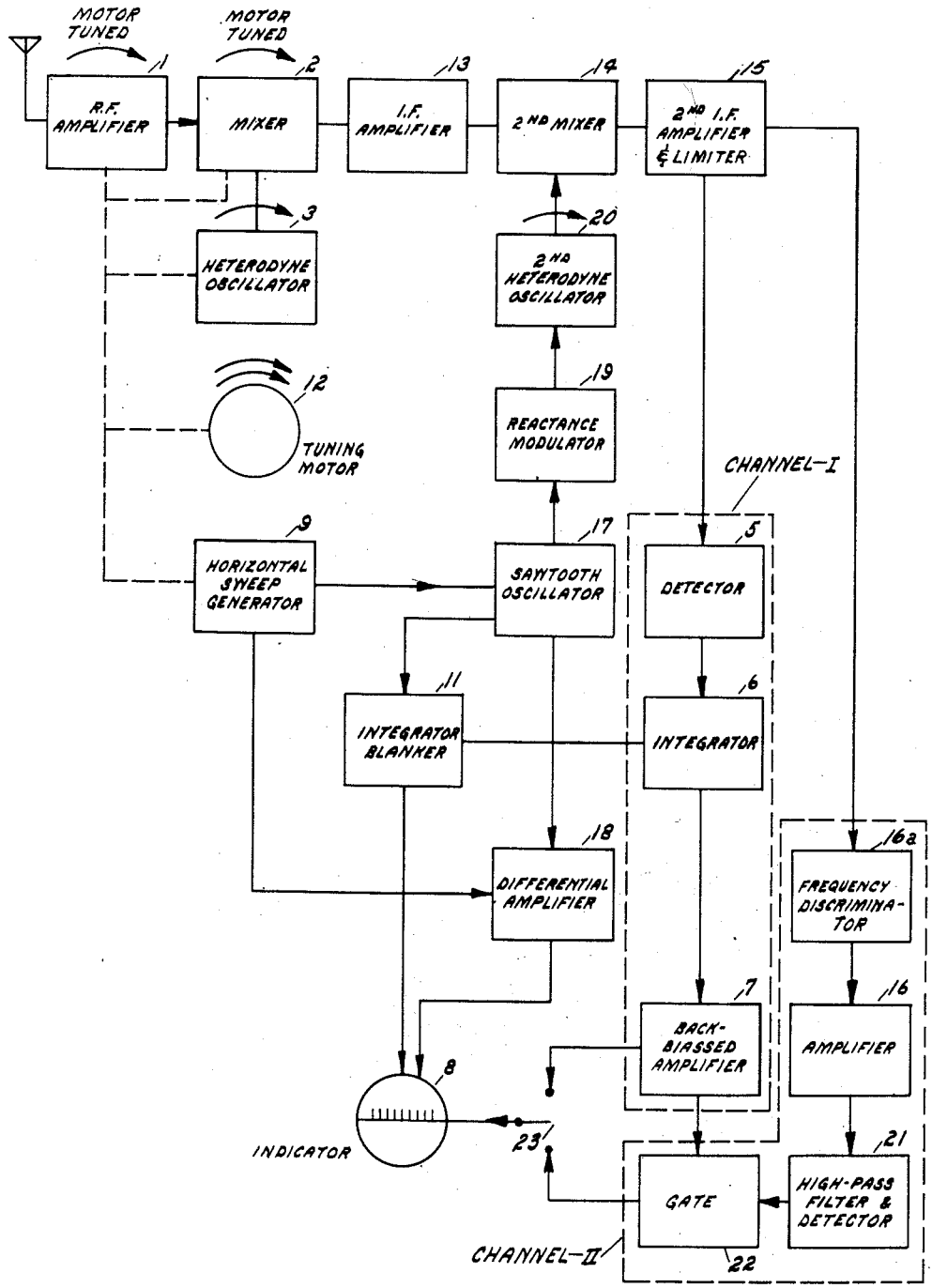
Figure 3 represents in block diagram a second form of my invention.

In Figure 3 is shown the circuit of a two channel panoramic receiver. Channel I is similar to the circuit shown in Figure 1. Channel II is responsive to frequency modulated signals but unresponsive to pulse signals, amplitude modulated signals, or unmodulated continuous waves.

The structure, connection, and operation of the elements of a normal panoramic receiver therein shown are the same as for the similarly numbered elements shown in Figure 1, namely, sweeping tuned-radio-frequency receiver 1, mixer 2, sweeping heterodyne oscillator 3, horizontal sweep generator 9, tuning motor 12.

Figure 4:
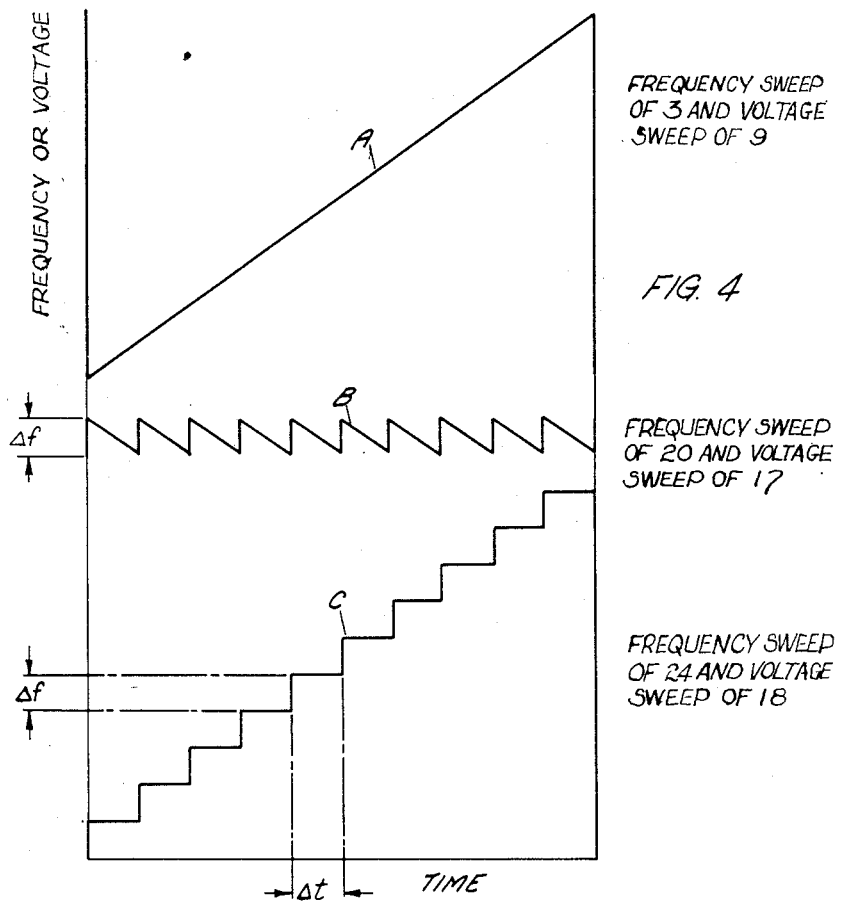
Figure 4 represents the forms of the sweep voltages and the frequency sweeps used in the second form of my invention.

Horizontal sweep generator 9 generates a saw-tooth sweep voltage wave in synchronism with the sweep of the sweeping receiver 1 and of local oscillator 3 (curve A of Figure 4). However, its output voltage is not applied directly to the sweep plates of indicator 8, but is first modified as will appear presently. The output voltage of horizontal sweep generator 9 is applied to saw-tooth oscillator 17. This generates a high harmonic of the panoramic sweep frequency, which as before may be taken as the 1,000th harmonic. From this a pulse of the same repetition rate is generated and passed to integrator blanker 11 as before. In addition there is generated in saw-tooth oscillator 17 a harmonic saw-tooth voltage wave at the harmonic rate (curve B of Figure 4). This harmonic saw-tooth wave is passed to differential amplifier 18, where it is combined differentially with the output of horizontal sweep generator 9. In differential amplifier 18 the two signals are amplified to have the same rate of increase but to be of opposite polarity, so that when they are superposed there results a stepped sweep voltage wave (curve C of Figure 4). The horizontal portion of each step represents a constant voltage lasting for the period $\Delta t$ of the selected harmonic of the panoramic sweep. The vertical portion of each step represents the discontinuous jump in voltage between steps.

This stepped voltage from differential amplifier 18 is applied to the sweep plates of cathode ray indicator 8. It will be seen that the cathode ray spot will not travel smoothly across the screen but jumps across in 1,000 steps remaining stationary momentarily after each jump. These steps may be considered equally spaced across the screen.

It is desired that the stationary positions of the cathode ray spot shall appear separate and distinct. Accordingly the blanking pulse from integrator blanker 11 is applied to cathode ray tube indicator 8 to blank the spot during the jumps, that is at the instant of the voltage jump of curve C.

The saw-tooth voltage wave output from saw-tooth oscillator 17 is passed to reactance modulator 19, which applies effectively a varying reactance to the frequency determining part of second heterodyne oscillator 20. This second oscillator generates a second heterodyne signal with any desirable value of mean frequency, preferably lower than the intermediate frequency of intermediate frequency amplifier 13. The second heterodyne signal has a frequency modulation envelope which is that of the saw-tooth wave of saw-tooth oscillator 17. In each cycle the signal starts at a high frequency and decreases over a range $\Delta f$. The pass band width of intermediate amplifier 13 is made at least equal to $\Delta f$. The outputs of second local oscillator 20 and intermediate frequency amplifier 13 are mixed in second mixer 14 as in a normal heterodyne receiver except that the heterodyne frequency is not quite constant.

The output of second mixer 14 is amplified further in second intermediate frequency amplifier 15, which is made to have a pass band width equal to that of amplifier 13. The last stage of amplifier 15 contains a limiter, which reduces all signals of sufficient intensity to a common level.

The output of second intermediate frequency amplifier 15 is divided between two channels. In channel I, which comprises detector 5, integrator 6, and back-biased amplifier 7, continuous signals are passed and pulse signals are suppressed in the same manner as has been described in connection with the device shown in Figure 1. The parts are similar to the similarly numbered parts shown in Figure 1, and integrator 6 receives signal from integrator blanker 11 quite as before. The integrating interval is the period of the sweep of second heterodyne oscillator $\Delta t$. To place the signal brought through this channel onto the signal plates of indicator 8 switch 23 is thrown up, and any continuous signal received on receiver 1 then appears as a pip on the screen at the position corresponding to its frequency. As before pulse signals below a predetermined width will not appear.

It is seen that channel I passes both amplitude modulated signals and frequency modulated signals as well as pure continuous wave. In order to determine whether a signal thus passed is frequency modulated or not channel II is used.

Channel II receives the output of second intermediate frequency amplifier 15 and passes it through a standard frequency discriminator 16a, amplifier 16, high pass filter and detector 21, gate 22, each in turn, and through switch 23, when thrown down, to the signal plates of cathode ray tube indicator 8.

It will be seen that the combined action of heterodyne oscillator 3 and second oscillator 20 is the same as though the received signal were mixed with a single heterodyne which jumped from one constant frequency to the next in a manner represented by curve C of Figure 4. In this connection the ordinate of the graph is frequency, and the frequency steps are $\Delta f$. The combination of channel II with the preceding radio and intermediate frequency stages then constitutes a panoramic frequency modulation receiver tuned in successive discrete steps. In accord with the character of frequency modulation receivers channel II will pass frequency modulation but not amplitude modulation.

While the above statement is true in general, there are two exceptions to be noted. First, during the frequency jump of second heterodyne oscillator 20 amplitude modulated signals will appear as frequency modulated and will pass through channel II. Such signals are prevented, however, from producing a signal on cathode ray indicator 8 by virtue of the fact that the spot is blanked out during the frequency jump, as has been explained. High pass filter 21 is interposed to eliminate any other signals arising in channel II due to the sudden discontinuities in the frequency of the second heterodyne signal.

The other exception is that channel II might also pass intermittent signals even though not frequency modulated. Such signals are prevented from reaching the indicator by the operation of gate 22. Gate 22 receives the output signal from back-biased amplifier 7 of channel I (in parallel with the signal plates of indicator 8). This signal operates gate 22 in the sense that when there is a continuous signal in channel I signal from channel II passes through the gate, since in this case back-biased amplifier 7 is passing signal through most of the interval of scanning $\Delta t$. Thus frequency modulated signal passes through gate 22 to switch 23, but intermittent signals and, of course, pulse signals produce no signal out of back-biased amplifier 7, and gate 22 prevents them passing through from channel II to switch 23. Accordingly only continuous frequency modulated signals pass gate 22. By throwing switch 23 down the output of gate 22, that is, of channel II is put upon the signal plates of indicator 8. Signals are distinguished as amplitude modulated and not frequency modulated by the fact that they appear in indicator 8 with indicator 8 connected to channel I but not with it connected to channel II. Frequency modulated signals on the other hand appear when indicator 8 is connected to either channel.

Figure 5:
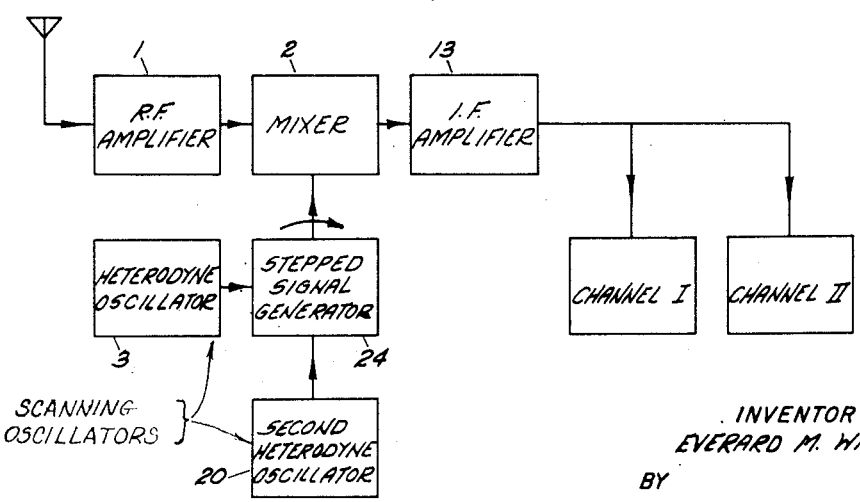
Figure 5 represents in block diagram the circuit of a modification of the second form of my invention.

The circuit shown in block diagram in Figure 5 discloses a third embodiment of my invention in a modification of part of the device shown in Figure 3. In this modification the second mixer 14 and second intermediate amplifier 15 are discarded and the heterodyne oscillator 3 no longer feeds signal directly to mixer 2. Instead, frequency-modulated heterodyne oscillator 3 and second frequency-modulated heterodyne oscillator 20 both feed signal to a stepped signal generator 24, which feeds signal to mixer 2. Stepped signal generator 24 is a mixer which heterodynes the output of oscillators 3 and 24. The output of mixer 2 is fed to intermediate frequency amplifier 13 as before. The output of intermediate amplifier 13 is fed directly to channels I and II. Other connections remain as shown in Figure 3. In stepped signal generator 24 the frequency sweeping signals from heterodyne oscillator 3 and the frequency sweeping signal from second heterodyne oscillator 20, the frequencies of both of which vary linearly with time at the same rate, but at different repetition frequencies, are combined differentially to form a difference-frequency signal in the form of an actual stepped heterodyne signal as shown at C in Figure 4. This may be done by ordinary heterodyne methods or other means well known in the art. In this heterodyne signal the frequency increases by discrete steps $\Delta f$ at discrete time intervals $\Delta t$. This stepped signal is applied to mixer 2 as the heterodyne. The resultant operation from channels I and II on is the same as in the unmodified circuit. The circuit modification does not alter the over-all performance.

Having described several embodiments of my invention I wish to be understood that further modifications and substitutions are within the scope of my invention, which is to be limited only by the appended claims.

I claim:

1. In a panoramic radio receiver having a pass band of predetermined width and having means therein for sweeping the tuning thereof periodically through a band of frequencies considerably wider than said pass band, limiter means for limiting the amplitude of received signals, a detector responsive to said limited signals, intermittently operating integrating means for producing voltages in response to the output of said detector over intervals of time equal to the time required for the tuning to sweep across a frequency band equal to said pass band, means rejecting those voltages below a predetermined threshold of amplitude and passing those above said threshold, and a panoramic indicator coupled to said last-named means and synchronized with the tuning sweeps for indicating all said voltages above said threshold.

2. In a panoramic radio receiver receiving signals, a first heterodyne oscillator generating a first heterodyne signal the frequency whereof periodically sweeps linearly with time over a predetermined range at a first repetition rate, first mixer means transforming the received signals and the first heterodyne signal into first intermediate frequency signals, a first intermediate frequency channel having a pass band of predetermined width and receiving and amplifying the first intermediate frequency signals, a second heterodyne oscillator generating a second heterodyne signal the frequency whereof periodically sweeps over a range approximately equal to said pass band with a rate of change of frequency equal and opposite to that of the first heterodyne signals and at a second repetition rate which is an integral multiple of the first repetition rate, second mixer means combining the first intermediate frequency signals with said second heterodyne signal to form second intermediate frequency signals, a detector for detecting said second intermediate-frequency signals, and signal translating means coupled to the output of said detector.

3. The receiver set forth in claim 2, wherein said translating device comprises a cathode ray tube for presenting signals in the output of said detector, and means suppressing presentation on said cathode ray tube during an interval of time embracing the end of each sweep of the first and second heterodyne signals.

4. The receiver set forth in claim 2, wherein said signal translating means comprises integrating means for integrating the output of said detector during discrete intervals each equal to the period of each sweep of said second heterodyne signals, means rejecting voltages appearing in the output of said integrating means which are below a predetermined threshold of amplitude and passing voltages above that threshold, and cathode-ray tube means for presenting the output signals thus passed, said cathode-ray tube means having a time base synchronized at said first repetition rate.

5. A panoramic superheterodyne receiver comprising oscillator means for generating a signal the frequency of which progressively varies in the same direction by discrete steps equal to the pass band of said receiver at discrete intervals, a mixer for heterodyning said signal with incoming signals to derive intermediate frequency signals, and a frequency modulation detector for demodulating said intermediate frequency signals.

6. In a panoramic receiver having a pass band of predetermined width, a means for periodically sweeping the tuning of said receiver through a band of frequencies, a limiter for limiting the amplitudes of all received signals, a detector for demodulating the output of said limiter means, intermittently operative means for integrating the output of said detector over a plurality of successive intervals of time during the time of each sweep whereby the amplitude of the signal developed in the output of said integrating means during each of said intervals is dependent upon the duration of a signal in the output of said detector, and means for translating only those signals in the output of said integrating means above a predetermined threshold of amplitude.

7. A receiver as set forth in claim 6, wherein said intervals are approximately equal to the time required to sweep said tuning through a range equal to said pass band.

8. A receiver as set forth in claim 6, wherein said intervals are not greater than the time required to sweep said tuning through a range equal to said pass band.

9. In a panoramic superheterodyne receiver having a pass band of predetermined width, a heterodyne oscillator generating a radio frequency signal the frequency of which periodically varies linearly with time at a predetermined repetition rate, a mixer excited by received energy and said oscillator to derive intermediate frequency potentials, a limiter for limiting the amplitude of said potentials, a detector for demodulating the output of said limiter means, means for periodically developing signals at a frequency equal to an integral multiple of said repetition rate, the period of said signals being equal to the time required to vary the frequency of said heterodyne oscillator through the range of frequencies encompassed within said pass band, integrating means under the control of said signals for integrating voltages in the output of said detector at spaced intervals each equal to said duration, means for amplifying those voltages in the output of said integrating means above a predetermined threshold of amplitude and rejecting those voltages in the output of said integrating means below said predetermined threshold, and means responsive to the output of said amplifying means and synchronized with the frequency variation of said heterodyne oscillator for indicating the frequencies of all received signals.

10. In a panoramic receiver, a first oscillator, means for sweeping at a predetermined rate the frequency of said oscillator through a predetermined range at a first repetition frequency, a first mixer for deterodyning the received signal with the output of said oscillator to produce intermediate frequency signals, a second oscillator, means for sweeping at a rate which is substantially equal to said predetermined rate the frequency of said second oscillator linearly with time through a predetermined range of frequencies at a second repetition frequency which is an integral multiple of said first repetition frequency and over a range equal to a fraction of said predetermined range, and a mixer for combining the output of said second oscillator with said first intermediate frequency signals to derive resultant signals the frequency of which varies progressively in substantially discrete steps.

11. A panoramic radio receiver comprising a tuned channel having a pass band of predetermined width, and means for periodically varying the mean response frequency of said receiver in discrete steps equal to said pass band, said means maintaining said response frequency substantially constant at each step for discrete intervals.

12. A receiver as set forth in claim 11, including a frequency modulation detector for demodulating the received signals, and a cathode ray indicator having means synchronized with the variation of said response frequency to progressively deflect the cathode ray beam thereof in discrete steps, and means controlled by the output of said detector to further control said beam.

13. A superheterodyne receiver including, first and second oscillators, means for simultaneously producing a periodic sweep of the frequencies of said oscillators linearly at the same rate but in opposite directions, the absolute range of sweep of said first oscillator being greater than that of said second oscillator, the frequency of sweep of said second oscillator being an integral multiple of that of said first oscillator, means for combining the outputs of said oscillators to derive resultant oscillations the frequency of which varies in discrete steps at discrete intervals, and means for utilizing said oscillations to heterodyne received signals.

14. A receiver for selecting from a group of signals of varying duration only those which are above a predetermined duration, comprising a limiter for limiting the amplitudes of said signals, an integrator connected to said limiter including a storage element charged by said limited signals, means for discharging said storage element at spaced intervals at least equal to said predetermined duration to derive pulses having amplitudes proportional to the duration of said signals, and threshold responsive transmission means excited by said pulses for passing only pulses having an amplitude derived from signals of said predetermined duration.

15. In a panoramic receiver having an output, means for progressively sweeping the tuning of said receiver in discrete steps at discrete intervals while maintaining said tuning substantially constant during the whole of each interval, first means coupled to the output of said receiver and responsive to frequency modulated, amplitude modulated and unmodulated continuous signals, second means coupled to the output of said receiver responsive to frequency modulated signals only, and means for selectively visually presenting the output of said first or second means.

16. A receiver as set forth in claim 15, including means for suppressing the presentation of pulse signals having less than a predetermined width.

17. A panoramic receiver having periodic means for progressively sweeping the tuning of said receiver in a single direction throughout an extended frequency band in discrete momentary frequency jumps and means for maintaining the frequency to which said receiver is tuned substantially constant in the interval between said momentary frequency jumps, and cathode ray tube means connected to the output of said receiver for visually presenting the signals received thereby.

18. A panoramic receiver as described in claim 17, including means for suppressing the presentation of received signals having a duration less than said intervals.

19. A panoramic receiver as described in claim 17, including frequency modulation detection and amplitude modulation detection channels and means for selectively connecting said channels to said cathode ray tube means.

20. The panoramic receiver described in claim 17, wherein said receiver has a pass band which is a fraction of the frequency range through which the tuning of the receiver is swept, and said frequency jumps are substantially equal to the frequency range of said pass band.

21. The panoramic receiver described in claim 17, including means for blanking said cathode ray tube means during said intervals and unblanking said cathode ray tube means during said frequency jumps.

22. The panoramic receiver described in claim 17, including means for sweeping the beam of said cathode ray tube means in synchronism with the sweeping of the tuning of said receiver, each sweep of said cathode ray tube beam consisting of a sequence of discrete jumps in synchronism with said frequency jumps.

23. The system of analyzing signals in a given frequency range, comprising periodic means for periodically scanning said frequency range unidirectionally, discrete successive portions of said frequency range being scanned intermittently, means for deriving a single pulse representing the signal in each said portions, and means for indicating each pulse on a frequency scale.

24. The system of analyzing signals in a given frequency range, comprising periodic means for periodically scanning said frequency range, the period of each scan consisting of a succession of intervals, means for deriving a single pulse representing all the signals received during each interval, and means for indicating each pulse on a frequency scale.

25. The system defined in claim 24, including further means for suppressing all indications between the occurrence of successive pulses.

EVERARD M. WILLIAMS.

REFERENCES CITED

The following references are of record in the file of this patent:

UNITED STATES PATENTS

| Number | Name | Date |
|---|---|---|
| Re. 21,473 | George | June 4, 1940 |
| 2,174,566 | Case | Oct. 3, 1939 |
| 2,224,134 | Blumlein | Dec. 10, 1940 |
| 2,250,819 | Wolf | July 29, 1941 |
| 2,250,862 | Farrington | July 29, 1941 |
| 2,258,599 | Carlson | Oct. 14, 1941 |
| 2,273,097 | Foster et al. | Feb. 17, 1942 |
| 2,273,134 | Mountjoy | Feb. 17, 1942 |
| 2,275,460 | Page | Mar. 10, 1942 |
| 2,312,203 | Wallace | Feb. 23, 1943 |
| 2,381,940 | Wallace et al. | Aug. 14, 1945 |
| 2,405,843 | Moe | Aug. 13, 1946 |
| 2,414,096 | Dimond | Jan. 14, 1947 |
| 2,419,772 | Gottier | Apr. 29, 1947 |
| 2,440,278 | Labin et al. | Apr. 27, 1948 |
| 2,443,619 | Hopper | June 22, 1948 |
| 2,450,018 | Preisman | Sept. 28, 1948 |
| 2,451,632 | Oliver | Oct. 19, 1948 |
| 2,455,052 | Fisher | Nov. 30, 1948 |
| 2,457,676 | Holmes | Dec. 28, 1948 |
| 2,465,355 | Cook | Mar. 29, 1949 |
| 2,484,618 | Fisher | Oct. 11, 1949 |
| 2,502,294 | Wallace | Mar. 28, 1950 |
| 2,512,699 | Todd | June 27, 1950 |
| 2,520,141 | Hardy | Aug. 29, 1950 |
| 2,538,068 | Williams | Jan. 16, 1951 |